United States Patent
Augst

(10) Patent No.: US 11,192,459 B2
(45) Date of Patent: Dec. 7, 2021

(54) METHOD AND CHARGING APPARATUS FOR CHARGING A TRACTION ENERGY STORAGE DEVICE OF AN ELECTRICALLY DRIVEN VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/013,338

(22) Filed: Jun. 20, 2018

(65) Prior Publication Data

US 2018/0297481 A1 Oct. 18, 2018

Related U.S. Application Data

(63) Continuation of application No. PCT/EP2016/081170, filed on Dec. 15, 2016.

(30) Foreign Application Priority Data

Dec. 21, 2015 (DE) ...................... 10 2015 226 318.5

(51) Int. Cl.
*B60L 53/00* (2019.01)
*H02J 7/02* (2016.01)
(Continued)

(52) U.S. Cl.
CPC .............. *B60L 53/00* (2019.02); *B60L 53/14* (2019.02); *B60L 53/18* (2019.02); *B60L 58/12* (2019.02);
(Continued)

(58) Field of Classification Search
None
See application file for complete search history.

(56) References Cited

U.S. PATENT DOCUMENTS

2005/0242777 A1 11/2005 Van Beek et al.
2012/0098489 A1* 4/2012 Arai ..................... H01M 10/482
320/109
(Continued)

FOREIGN PATENT DOCUMENTS

CA 2 998 352 A1 10/2014
CN 1659758 A 8/2005
(Continued)

OTHER PUBLICATIONS

PCT/EP2016/081170, International Search Report dated Apr. 25, 2017 (Two (2) pages).
(Continued)

*Primary Examiner* — David V Henze-Gongola
(74) *Attorney, Agent, or Firm* — Crowell & Moring LLP

(57) ABSTRACT

A method for charging a traction energy storage device of an at least partially electrically driven vehicle includes detecting an interruption of a charging process, and determining a parameter which represents a reason for the interruption of the charging process. The method also includes performing at least one of the following measures as a function of the determined parameter: continuing the charging process in an unchanged or changed fashion, and performing a specific signaling process.

18 Claims, 1 Drawing Sheet

(51) Int. Cl.
- *H02J 7/04* (2006.01)
- *B60L 58/12* (2019.01)
- *B60L 53/14* (2019.01)
- *B60L 53/18* (2019.01)
- *H02J 7/00* (2006.01)

(52) U.S. Cl.
CPC ...... *H02J 7/0047* (2013.01); *H02J 7/007192* (2020.01); *H02J 7/027* (2013.01); *H02J 7/045* (2013.01); *B60L 2250/10* (2013.01); *B60L 2270/30* (2013.01); *Y02T 10/70* (2013.01); *Y02T 10/7072* (2013.01); *Y02T 90/14* (2013.01)

(56) References Cited

U.S. PATENT DOCUMENTS

| | | | |
|---|---|---|---|
| 2013/0015814 A1* | 1/2013 | Kelty | B60L 50/51 320/109 |
| 2013/0110340 A1 | 5/2013 | Park et al. | |
| 2013/0191321 A1 | 7/2013 | Lovett et al. | |
| 2014/0361745 A1* | 12/2014 | Nishita | B60L 53/63 320/109 |
| 2015/0251549 A1 | 9/2015 | Hofer et al. | |
| 2016/0377306 A1* | 12/2016 | Drees | G05B 15/02 700/295 |

FOREIGN PATENT DOCUMENTS

| | | |
|---|---|---|
| CN | 102545303 A | 7/2012 |
| CN | 102906961 A | 1/2013 |
| CN | 103219758 A | 7/2013 |
| CN | 104903143 A | 9/2015 |
| DE | 10 2013 200 831 A1 | 7/2013 |
| DE | 10 2012 221 807 A1 | 5/2014 |
| JP | 2004-168263 A | 6/2004 |
| JP | 2012-75280 A | 4/2012 |
| WO | WO 2014/082952 A2 | 6/2014 |

OTHER PUBLICATIONS

German Search Report issued in German counterpart application No. 10 2015 226 318.5 dated Feb. 11, 2016, with Statement of Relevancy (Eight (8) pages).

Chinese Office Action issued in Chinese application No. 201680064163.3 dated Jul. 14, 2020, with English translation (Twenty One (21) pages).

Chinese Office Action issued in Chinese application No. 201660064163.3 dated Apr. 1, 2021, with English translation (Nineteen (19) pages).

\* cited by examiner

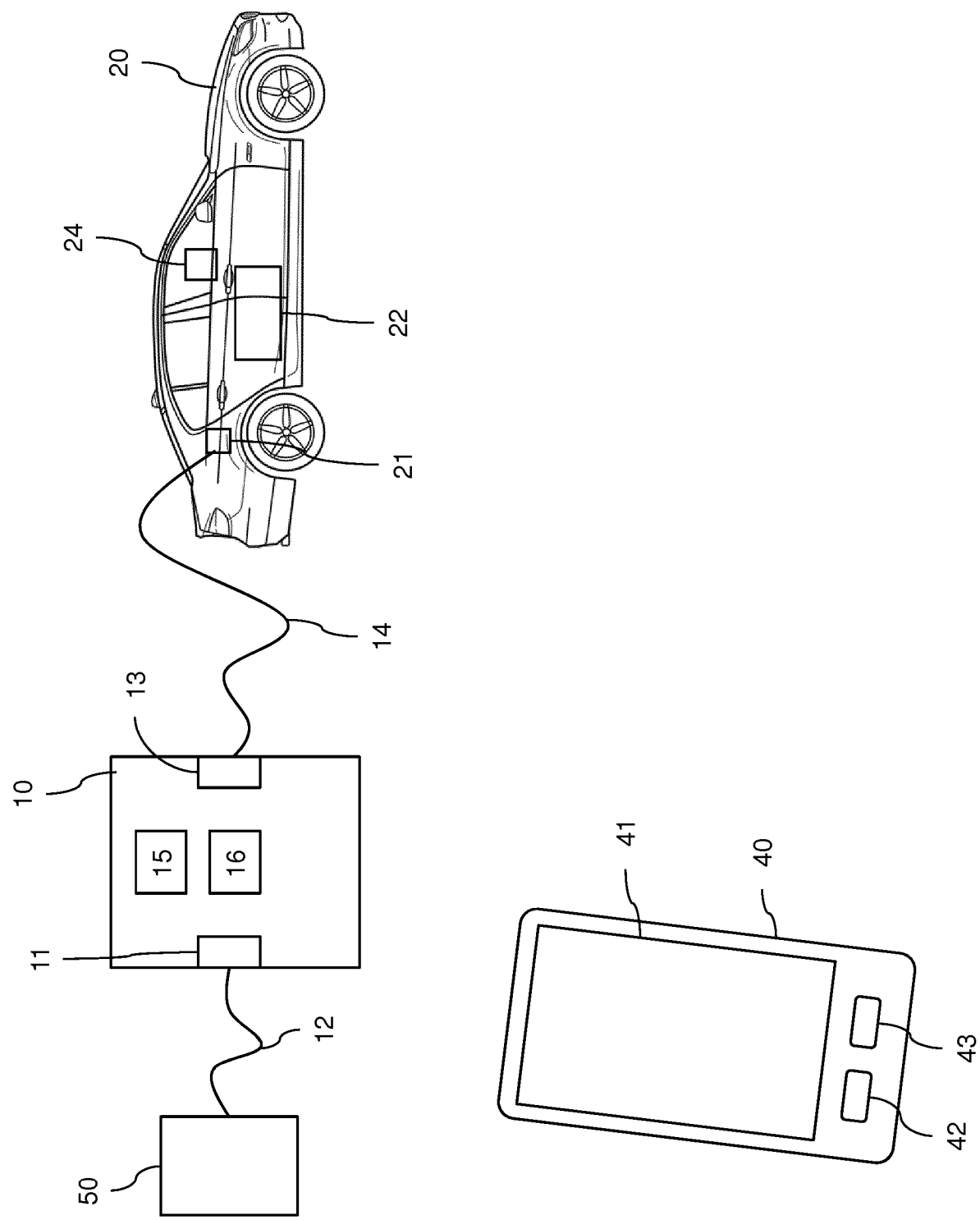

METHOD AND CHARGING APPARATUS FOR CHARGING A TRACTION ENERGY STORAGE DEVICE OF AN ELECTRICALLY DRIVEN VEHICLE

CROSS REFERENCE TO RELATED APPLICATIONS

This application is a continuation of PCT International Application No. PCT/EP2016/081170, filed Dec. 15, 2016, which claims priority under 35 U.S.C. § 119 from German Patent Application No. 10 2015 226 318.5, filed Dec. 21, 2015, the entire disclosures of which are herein expressly incorporated by reference.

BACKGROUND AND SUMMARY OF THE INVENTION

The invention relates to a method for operating a charging device for charging a traction energy storage device of a vehicle or a traction battery, in particular an accumulator battery, of an at least partially electrically powered vehicle. The invention also relates to such a charging apparatus and to a computer program product.

As at least partially electrically powered vehicles have become more widespread, the significance of electrically charging these vehicles has grown. A charging process for these vehicles can take up a considerable period of time, e.g. 4 to 16 hours, owing to the large quantity of energy which is required and the properties of traction batteries. The availability of a sufficient charge, in particular for a planned or unplanned journey, repeatedly becomes a factor which can significantly limit the mobility in a particular situation and can result in further undesired consequences. It is also the case that e.g. in contrast to a starter battery of the vehicle, the consequences of an insufficiently charged traction energy storage device of the vehicle cannot be overcome within a short time, e.g. by means of an "external starting process".

A vehicle which can be operated at least partially electrically is to be understood as being a battery-operated vehicle or a hybrid-electric vehicle. In a battery-operated vehicle, the drive of said vehicle is provided essentially by means of one or more electric motors whose drive energy originates essentially from a traction energy storage device. In contrast, a hybrid-electric vehicle has both an internal combustion engine and an electric motor which is fed from a traction energy storage device. Depending on the design of the vehicle, it can be powered exclusively with the internal combustion engine, exclusively with the electric motor or with a combination of the two.

In both types of vehicles which can be operated electrically it is necessary to charge the traction energy storage devices. This can be done, for example, at so-called charging points which can be found currently in an isolated fashion in public parking spaces, in private parking spaces or along important traffic routes.

It is also possible to charge a traction energy storage device of the vehicles which can be operated electrically at a domestic power terminal or at conventional domestic sockets with a mains voltage of e.g. 120 or 230 V or 380 V. For this purpose, it is possible to use, for example, both charging apparatuses which are permanently installed in a garage as well as external portable charging apparatuses. Such a charging apparatus can typically be connected to a domestic socket and to the vehicle with respective plug connectors. The charging time of such socket charging apparatuses is considerably longer compared to the above-mentioned charging points. For example, the charging process can last an entire day or an entire night.

An additional disadvantage when using portable socket charging apparatuses is that they can be influenced by a multiplicity of conceivable faults even to a greater extent than charging points or permanently installed charging apparatuses.

If the charging takes place in the interior of a private garage, a charging process can be put at risk e.g. by authorized or unauthorized operator control, e.g. incorrect operator control, power system failures or overloading of the capacitance of the power terminal.

However, charging apparatuses are frequently also used which are accessible to third parties, e.g. on an external parking area or even installed or parked the sidewalk. As a result, there are further reasons for interrupting the charging in that the charging apparatus can be unplugged and even misappropriated.

An interruption of the charging process e.g. a power failure, incorrect operator control or merely unplugging of a charging apparatus can already bring about a situation in which the vehicle user who does not actively monitor the charging process will, under certain circumstances, be presented with a state of charge which is unsatisfactory, and the mobility of said user will be significantly restricted. The success and reliability of a charging process and therefore also the mobility of the user can therefore be put at risk owing to various reasons which are virtually impossible to plan or predict. In all the described cases, the charging time and the reliability of a charging process constitute a significant challenge for successful widespread introduction of individual electric mobility.

An object of the present invention is to specify a method for operating a charging apparatus for charging a traction energy storage device of an at least partially electrically powered vehicle which reduces disadvantages in relation to a charging process of such a vehicle. In particular, the risk of non-availability of expected charging of the traction energy storage device is reduced, as is also the risk of incorrect operator control or illegitimate operator control of the charging apparatus. A further object of the present invention is to specify a corresponding computer program product, a charging apparatus and a charging system.

According to a first aspect, a method for controlling a charging process for charging a traction energy storage device of an at least partially electrically powered vehicle is proposed in which an interruption of a charging process is detected; a parameter is determined which represents the reason for the interruption of the charging process; and one or more of the following measures are carried out as a function of the determined parameter: the charging process is continued in an unchanged or changed fashion; a specific signaling process takes place.

The determined parameter can represent here one of a plurality of possible reasons for the interruption of the charging process, e.g. in the form of a value of the parameter as encoded information. In addition, at least one parameter can alternatively or additionally comprise a quantitative measure which characterizes the interruption of the charging process.

In the method, the qualitative and/or quantitative characteristic variables of the measures which are to be carried out are also particularly preferably varied. For example, the charging process can be continued with a changed intensity or current strength, wherein the changed current strength can depend on a determined reason for the interruption of the charging process. In this context, for example a renewed interruption of the charging process can be avoided, e.g. if the interruption of the charging process occurred owing to an overload of the domestic power terminal.

The measures for continuing the charging process which are optimized taking into account the determined reason for the interruption of the charging process are particularly preferably carried out. The optimization can comprise e.g. achieving a specific charging objective or at least a necessary minimum charge and/or avoiding renewed interruption of the charging process.

The success or the reliability of the charging process can be increased significantly by the proposed method, wherein the necessary monitoring requirement has to be met only to a minimized degree by a user or signaling to the user.

The traction energy storage device is, in particular, what is referred to as a traction battery or an energy storage device which is embodied in an expedient way. For example, the traction energy storage device can be an accumulator battery ("battery") or a capacitor system which is configured in the expedient way, what is referred to as a "super-cap", or some other energy storage device for storing a large quantity of electrical energy for use for driving the vehicle. There can be a traction energy storage device with or without conversion of the electrical charge energy into chemical energy.

The charging apparatus is preferably a portable, vehicle-external charging apparatus for charging the vehicle by means of a mains voltage. Such a charging apparatus can also be designed to transmit energy to the vehicle by means of induction or a specific plug connection. The charging apparatus here may be a "replacement" or "emergency" charging apparatus which is designed to be carried along in the vehicle on a temporary or permanent basis. However, the charging apparatus can also be positionally fixed, for example in the form of a charging point or what is referred to as a wall box which is anchored securely to a house wall or a garage wall.

The continuation of the charging process can be conceived as a resumption of a briefly interrupted charging process or as a renewed start of the charging process, e.g. with changed parameters.

The method can avoid the need for the user to carry out active monitoring of the charging process with respect to a state of charge to be achieved. With the method it is also possible to implement optimized measures without the involvement of the user even when the reasons for the interruption of the charging are unpredictable. This can also help to achieve further strategic objectives of the individual electric mobility and increase its prevalence.

According to one expedient refinement, the measures to be carried out, in particular characteristic variables of the measures to be carried out, are determined with means of vehicle and/or with means of a mobile user apparatus. In this context there can be provision that in order to carry out the measure or the measures a data transmission device and/or an actuator system of the vehicle and/or a mobile user apparatus of the user of the vehicle are activated.

The detection of the interruption of the charging process and/or the determination of the reason for an interruption of the charging process can be brought about using sensors which are installed in the charging apparatus and/or the vehicle, and by means of information which is collected by the vehicle and/or the mobile user apparatus and/or an external unit.

The mobile user apparatus can be, for example, a smart phone, a tablet PC, a smart watch or a smart close or corresponding appropriate developments.

In particular, in order to carry out the method the mobile user apparatus can also perform necessary computational tasks in that, for example, data which is acquired by means of measuring technology is processed for further evaluation and for carrying out the one or more measures. As a result it is not necessary to have to modify existing charging apparatuses. Therefore, costly changes to the vehicle can also be at least partially eliminated.

According to a further expedient refinement, it is possible to differentiate at least between the following reasons for the interruption of a charging process: an authorized or unauthorized change, in particular interruption, of the charging process, and a power failure. In this context, respective different suitable measures can be carried out when there are differently detected reasons for the interruption of the charging process.

In the case of a power failure, when re-activation occurs the extent of the consequences of the power failure for the charging objective to be achieved and the time at which the charging objective is to be achieved are detected, with the result that the charging process is continued in a changed fashion, in order to achieve the objective.

The reason for the interruption can be determined taking into account an evaluation of a situation. The evaluation of a situation can be carried out with means of the vehicle and/or of the charging device and/or of the mobile user apparatus. A computing unit which is independent of these components, for example a computing center and the like, can also be used for this purpose.

The reason for an interruption of the charging process can also be determined as a function of one or more probability values or a probability-dependent value. It is therefore possible, for example, to determine a probability value for a power failure, a corresponding probability value for authorized unplugging and a further probability value for unauthorized unplugging or misappropriation of the charging apparatus. In the case of a relatively high probability value for a power failure, the charging process is then varied as soon as the interruption of the charging has ended. If, in contrast, the probability for unauthorized unplugging or misappropriation of the charging apparatus exceeds a predetermined value, a signaling process, in particular transmission of specific information to the user, can be activated.

According to one expedient refinement, a charging objective and an associated first probability measure of the probability with which the achieving of the charging objective is at risk, are determined for the second value of the parameter which represents the reason for the interruption of the charging process. The determined charging objective can be, in particular, a new charging objective which differs from a preceding or original charging objective.

The measure for continuing the charging process and/or the measure for signaling are/is varied as a function of the determined probability measure. In addition, it is also possible to determine at least one time at which the charging process and/or a signaling process are/is to be continued.

The charging objective can be defined here as information which represents one or more states of charge which are to be achieved. The charging objective preferably represents two or more states of charge as a proportion with respect to the full charging capacity of the traction energy storage device (e.g. as a percentage) or as a range of the vehicle (e.g. kilometers, if appropriate with respect to a specific driving mode, if appropriate with respect to a specific route or type of route) which can be achieved with the charging objective. The charging objective can be determined, for example, in the charging apparatus, as a function of the determined reason for the interruption of the charging process. Alternatively, the charging objective can be determined in the mobile apparatus of the user and transmitted (in the form of one or more parameters) to the charging apparatus.

The at least one charging objective and at least one time for the at least one charging objective to be achieved are determined in particular as a function of one or more of the following criteria: a user activity of a vehicle user; a use history of the vehicle user, in particular with respect to times of day and/or days of the week; a calendar entry of the vehicle user, in particular a destination specification assigned to a calendar entry; a user indication, in particular in the form of calendar entries for the charging apparatus.

An original charging objective which is achieved in the case of a charging process running overnight without interruptions gives rise to a virtually completely charged traction energy storage device. A (new) charging objective which is determined in the case of an interruption of the charging process during the method can specify, for example for a working day starting from 8 am, a state of charge of at least 75%, or for a weekend day and on national holidays, a state of charge of 95% starting from 10 am. One or more measures for continuing the charging process can be varied here in such a way that the determined charging objective is achieved.

According to a further expedient refinement, when the determined probability measure undershoots a predefined threshold value, the charging process is continued with at least one changed charging parameter. In particular there can be provision that a second probability measure which is characteristic of the charging objective being achieved in good time is determined for the continued charging process, wherein the measure for signaling is carried out if the second probability measure undershoots a further predefined threshold value. The continuation of the charging process can be carried out with at least one changed charging parameter. The second probability measure can be determined by calculation, e.g. simulation, of a charging process. In the case of the charging parameter, for example a charging curve which specifies a chronological dependence of the charging current can be varied. In the case of a charging curve, further parameters can be taken into account, e.g. the current external temperature, and/or the external temperature which is predicted for the time period of the charging process, or a temperature profile, as well as a temperature of the traction energy storage device and/or the temperature profile thereof.

According to a further expedient refinement, the signaling measure comprises generating and/or transmitting or outputting user information to a user, wherein different user information is generated and/or transmitted or output to the user at different times as a function of the respective parameter which represents the reason for the interruption of the charging process. In this context, the times for the transmission of the user information can also be determined, and correspondingly varied, in the method e.g. as a function of the time of day or time of night and/or of further factors discussed here.

The user information can be here a warning which indicates a risk on the basis of determined probability values. This can be carried out e.g. by using different colors and/or symbols or sounds for different risks within the scope of the signaling process. The signaling process can furthermore have a handling instruction. Likewise, an operator control input request can be a component of the signaling process, with which request, in particular, a decision is requested from the user.

Such an operator input request can contain e.g. options, such as for example the changing of the charging process, the ignoring of a changed charging process, the triggering of an alarm, the production of a reminder etc. The generation and transmission of the signaling process can take place in any desired sequence. For example, a computer program, e.g. an "App" (Application) which runs on the mobile user apparatus can read in the information relating to the interruption of the charging process and subsequently generate the signaling process in the manner described above. The signaling process can take place in the form of an automatic transmission of a message to an email address of the user or an account in a social network. It is also possible merely to transmit information indicating at which time which signaling process is to be triggered with another device, e.g. the mobile user apparatus, as the signaling process.

According to a further refinement, for the purpose of signaling a theft warning system of the vehicle is actuated. The signaling process which is output by the theft warning system preferably differs here from a signaling process such as is triggered in the event of a theft of the vehicle. For example, only lights and/or signaling lights of the vehicle are actuated. The theft warning system can for this purpose be provided with a plurality of warning stages which are each more severe or different than the previously mentioned warning stage.

A possible sequence is as follows: if the charging apparatus has been unplugged without authorization when the vehicle is locked (i.e. a flow of current is no longer possible owing to a disconnected cable) and after the unplugging the vehicle has not been opened after a specified first time (e.g. 5 to 30 s) or is deactivated by the mobile user apparatus of the user, a first activation of the theft warning system of the vehicle occurs. The activation can take the form of flashing headlights or flashing hazard warning lights, e.g. with a special rhythm. If a further, second specified time (e.g. 10 to 60 s) has passed and the second condition has not yet been met, a second activation of the theft warning system of the vehicle takes place, wherein the theft warning system is activated with sounding of the horn which becomes louder and louder incrementally. It is then optionally possible to transmit a message, e.g. an SMS (Short Message Service), an MMS (Multimedia Message Service), an email, a message to an account of a social network and the like, to the mobile user apparatus or to some other apparatus of the user.

For example, the mobile user apparatus exchanges data with the vehicle and/or with the charging apparatus by means of a wire-bound or wireless interface.

According to a further expedient refinement the method comprises a one-way or reciprocal identification process and/or a pairing process between the mobile user apparatus and/or the vehicle and/or the charging apparatus. Therefore, e.g. an authorization for control of the charging process or signaling process can be ensured. In this context, various methods which are known according to the prior art or are new and which have the purpose of identifying or pairing electronic units can be applied or adapted to the method.

According to a second aspect, the invention relates to a computer program product which can be loaded directly into the internal memory of a digital computer and comprises software code sections with which the steps are executed according to the method described above when the product runs on a computer. The computer program product can be stored on a storage medium such as e.g. a USB storage stick, a DVD, a CD-ROM, a hard disk or the like. Likewise, the computer program product can be capable of being transmitted via a communication link (in a wireless or wire-bound fashion). The computer on which the computer program product runs can be a computing unit of the abovementioned mobile user apparatus, a computing unit of the vehicle, a computing unit of the charging apparatus or a combination of the abovementioned computing units.

According to a third aspect, the invention comprises a charging apparatus for charging a traction energy storage device of an at least partially electrically powered vehicle, wherein the charging apparatus comprises the following: a first means for detecting an interruption of a charging process; a second means for determining a parameter which represents the reason for the interruption of the charging process; and a third means for carrying out one or more of the following measures as a function of the value of the parameter, which means is designed to continue the charging process in an unchanged or changed fashion and/or to activate a signaling process.

The charging apparatus according to the invention has the same advantages as have been described above in connection with the method according to the invention.

In one expedient refinement, the charging apparatus can be an, in particular portable, vehicle-external charging apparatus.

The charging apparatus can be embodied as at least one electronic unit which is integrated into a specific, e.g. standardized charging cable, for charging at least partially electrically powered vehicles. In this context, the electric unit can comprise, in addition to the scopes described above, e.g. a voltage transformer, an overvoltage protection means, a unit for exchanging data, e.g. a transmitter unit.

The charging apparatus can also be a positionally fixed charging apparatus, e.g. a charging point, or can be configured as a charging apparatus which is fixedly connected to a wall of a house or of a garage.

According to a fourth aspect, the invention comprises a charging apparatus for charging a traction energy storage device which comprises a transceiver unit or connected to a transceiver unit, wherein the charging apparatus is configured to exchange the data for executing one or more steps of the method with a transceiver unit of the vehicle and/or a mobile user apparatus. Here, it is possible to allow the method described here to run as a distributed method.

According to a fifth aspect, the invention also comprises a system for charging a traction energy storage device of a vehicle which can be operated at least partially electrically, wherein the system comprises the charging apparatus disclosed here, a correspondingly configured, at least partially electrically powered vehicle, and a correspondingly configured mobile user apparatus. In particular, in this context the charging apparatus, vehicle or mobile user apparatus is configured or optimized to execute the method, e.g. by providing corresponding data interfaces.

The vehicle is preferably an electrically powered motor vehicle (passenger car, truck) or a two-wheeled or three-wheeled vehicle. A two-wheeled vehicle can be a motor scooter, a motorcycle or a moped, a pedelec, an electric bike or an electrically powered single-person transportation means with just two wheels on the same axle (e.g. a Segway personal transporter). A two-wheeled or three-wheeled vehicle can, however, also be a corresponding or appropriate development of a means for individual mobility. This results in the advantages which are indicated explicitly or implicitly in this description, as well as further advantages which are not difficult for a person skilled in the art to follow.

The method described as above, a charging apparatus according to the invention, and the system for charging, also have the advantage of a high level of objective and subjective safety and reliability with respect to the individual mobility of the user.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a schematic illustration of a device for charging a traction energy storage device of a vehicle which can be operated at least partially electrically.

DETAILED DESCRIPTION OF THE DRAWING

In FIG. 1, a vehicle which can be operated electrically is characterized by the reference symbol 20. The vehicle 20 is an electric vehicle or a hybrid vehicle. The latter comprises a traction energy storage device 22 which is electrically connected to a vehicle charging terminal 21 for the purpose of charging via a portable, vehicle-external charging apparatus 10. Furthermore, the vehicle comprises a transceiver unit 24. Since a person skilled in the art is familiar with the design of a vehicle which can be operated at least partially electrically, a further detailed description of the vehicle is not given.

The charging of the traction energy storage device 22 of the vehicle 20 takes place, as described, via the charging apparatus 10. The charging apparatus 10 comprises a mains terminal 11 and a charging terminal 13. The mains terminal 11 is connected via a mains cable 12 to a supply system terminal 50, e.g. a domestic socket, of a public power system. A voltage of e.g. 220 V (low voltage) is made available at the supply system terminal 50. The charging terminal 13 of the charging apparatus 10 is connected to the vehicle charging terminal 21 via a charging cable 14. The charging apparatus 10 also comprises a transceiver unit 15 and a computing unit 16.

Furthermore, a mobile user apparatus 40 is illustrated. The mobile user apparatus 40 is, for example, a smartphone or a tablet PC which has an input/output means 41 in the form of a touchscreen, and optionally one or more pushbutton keys 42, 43. The mobile user apparatus could furthermore also be what is referred to as a smart watch or a smart close.

The control of a charging process for charging the traction energy storage device 22 of the vehicle 20 comprises the step of detecting an interruption of the charging process. The detection of an interruption of the charging process can be carried out, for example, using sensors which are present in the charging apparatus 10 and/or in the vehicle 20. An interruption can be caused, for example, by the occurrence of a power failure in the supply system. Likewise, an interruption can be authorized or unauthorized unplugging of one of the cables 12 or 14 from the charging apparatus 10 or the supply system terminal 50 or the vehicle 20.

Within the scope of the method a parameter is determined which represents the reason for the interruption of the charging process. In this context, the parameter which represents the reason for the interruption of the charging process can comprise a respective value which indicates authorized or unauthorized switching off or unplugging of the charging apparatus 10 a power failure. It is possible to detect whether a power failure is short-term or long-term on the basis of, for example, the undershooting or exceeding of a predefined time value since the occurrence of the power failure.

It is possible to detect, for example, whether a power failure has occurred by virtue of the fact that a message is transmitted to the charging apparatus 10 by an infrastructure computing unit (not illustrated in more detail in FIG. 1) which has knowledge of a power failure in the area in which the supply system terminal 50 is located. In one refinement, such a message can be transmitted to the mobile user apparatus 40 which then either processes this information itself or transmits it to the charging apparatus 10 for further processing. In a further variant, the information which is made available by the infrastructure computer could also be transmitted to the vehicle 20 for processing or for passing on to the charging apparatus 10, instead of being transmitted to the mobile user apparatus 40.

The processing of information which is received by the infrastructure computing unit by the mobile user apparatus 40 and/or the vehicle 20 has the advantage that the charging apparatus 10 can be equipped with a comparatively simple computing unit 16. In contrast, computationally intensive processing steps can run in an App on the mobile user apparatus 40 or the vehicle 20.

Depending on the parameter which is determined, either one or more of the following measures are carried out. The charging process can be continued in an unchanged or changed fashion. Alternatively or additionally, a signaling process can be activated.

In this context, a charging objective and an associated first probability measure of the probability of the achievement of the charging objective being put at risk is determined, in particular, for the determined parameter which represents the reason for the interruption of the charging process as a power failure. The measure for continuing the charging process, if appropriate with an additional signaling process, is varied as a function of the probability measure. The charging objective constitutes information which represents a state of charge at a specific time in the future, wherein the state of charge should be achieved at this time. A power failure can then lead to a situation in which the originally defined charging objective, e.g. achieving a state of charge of 75% on a respective work day starting from 8 am, is at risk. It is therefore possible to change, as a measure, a charging curve which specifies a chronological dependence of the charging current, in such a way that the charging objective is still achieved at the desired time by means of a higher current.

In this context, other parameters, such as ambient temperatures and a temperature of the traction energy storage device 22 of the vehicle 20, can also be taken into account. If the aimed-at state of charge cannot be achieved, it is possible, for example, additionally to transmit a message from the charging apparatus 10 to the mobile user apparatus 40, with the result that the user is informed about the charging objective which has not been achieved. The message can be in the form of an SMS, an MMS or a message which is directed to an account of a social network of the user.

The charging objective can furthermore be determined as a function of an evaluated user activity of a use history of the vehicle, in particular with respect to days of the week or a specific calendar entry of the user in which a destination specification is also evaluated. Furthermore, it is also conceivable to take into account user specifications, in particular if they are stored in a calendar entry for the charging apparatus. According to this requirement, it is possible to determine, for example on the basis of a location which is assigned to a calendar entry, which state of charge has to be reached in order to ensure that the vehicle reaches this location with the energy contained in the traction energy storage device 22.

If the parameter represents the authorized or unauthorized switching off or unplugging of the charging apparatus, it is therefore possible for signaling to take place in the way previously described above as a function thereof. It is therefore possible, for example in the case of unauthorized unplugging of the charging apparatus, for a message to be transmitted directly to the mobile user apparatus 40, with which message the user is alerted to the present situation. The signaling process can, moreover, be supported by the fact that, for example, functions of a theft warning system of the vehicle 20 are activated. This type of signaling process preferably differs from a signaling process in the case of a theft of the vehicle. Such a message can furthermore comprise, in addition to a warning, also a handling instruction or an operator control input request, which is intended to bring about a request to the user to make a decision. Such an operator control input request can serve to change a charging process or alternatively to select one of a plurality of specified charging curves, to trigger an alarm, e.g. of the vehicle, and the like. The generation and transmission of the signaling process can take place in any desired sequence. This can take place, in particular, by means of an App which runs in the vehicle or preferably the mobile user apparatus 40 and which reads in information relating to the interruption of the charging process and subsequently generates correspondingly prepared user information.

The proposed method satisfies customer demand for an objective and subjective level of safety which relates to the operation of the charging apparatus. As a result of the fact that the charging process is optimized with respect to an aimed-at charging success, a higher level of acceptance for the operation of electrically powered vehicles is obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Charging apparatus
11 Mains terminal
12 Mains cable for connecting the mains terminal to a supply system terminal
13 Charging terminal
14 Charging cable for connecting the charging terminal to a vehicle charging terminal
15 Transceiver unit
16 Computing unit
20 Vehicle
21 Vehicle charging terminal
22 Traction energy storage device
24 Transceiver unit
40 Mobile user apparatus
41 Input/output means
42 Pushbutton key
43 Pushbutton key
50 Supply system terminal

What is claimed is:

1. A method for charging a traction energy storage device of an at least partially electrically powered vehicle, the method comprising the acts of:
   detecting an interruption of a charging process;
   determining a reason for the interruption of the charging process according to probability values of a plurality of potential reasons for the interruption; and
   selecting at least one measure from among a set of measures stored in a computer memory, based on the determined reason for the interruption of the charging process, the set of measures including: reinitiating the charging process, initiating a modified charging process, and performing a specific signaling process.

2. The method as claimed in claim 1, in which the at least one measure to be performed is determined using at least one of the vehicle and a mobile user apparatus.

3. The method as claimed in claim 1, in which the at least one measure to be performed is carried out using at least one of a data transmission device, an actuator system of the vehicle, and a mobile user apparatus.

4. The method as claimed in claim 1, further comprising differentiating between a plurality of reasons for the interruption of the charging process, wherein the plurality of reasons comprises: an authorized interruption of the charging process, an unauthorized interruption of the charging process, and a power failure.

5. The method as claimed in claim 1, further comprising:
   determining a charging objective; and
   determining an associated first probability which is characteristic of achieving the charging objective by a specific time,
   wherein the selection of at least one measure from among the set of measures is carried out and/or varied as a function of the first probability measure.

6. The method as claimed in claim 4, further comprising:
   determining a charging objective; and
   determining an associated first probability which is characteristic of achieving the charging objective by a specific time,
   wherein the selection of at least one measure from among the set of measures is carried out and/or varied as a function of the first probability measure.

7. The method as claimed in claim 5, further comprising determining the charging objective and at least one time for the charging objective to be achieved based on one or more of the following criteria:
   a user activity of a vehicle user,
   a use history of the vehicle user comprised of times of day and/or days of week,
   a calendar entry of the vehicle user comprising a destination specification, and
   a user specification comprising calendar entries for a charging apparatus.

8. The method as claimed in claim 6, further comprising determining the charging objective and at least one time for the charging objective to be achieved based on one or more of the following criteria:
   a user activity of a vehicle user,
   a use history of the vehicle user comprised of times of day and/or days of week,
   a calendar entry of the vehicle user comprising a destination specification, and
   a user specification comprising calendar entries for a charging apparatus.

9. The method as claimed in claim 5, wherein selection of at least one measure from among the set of measures includes selecting to initiate the modified charging process when the determined first probability measure undershoots a predefined threshold value.

10. The method as claimed in claim 7, wherein selection of at least one measure from among the set of measures includes selecting to initiate the modified charging process when the determined first probability measure undershoots a predefined threshold value.

11. The method as claimed in claim 9, further comprising determining a second probability which is characteristic of the charging objective being achieved by the specific time, wherein selection of at least one measure from among the set of measures includes selecting to carry out the specific signaling process when the second probability measure undershoots a further predefined threshold value.

12. The method as claimed in claim 10, further comprising determining a second probability which is characteristic of the charging objective being achieved by the specific time, wherein selection of at least one measure from among the set of measures includes selecting to carry out the specific signaling process when the second probability measure undershoots a further predefined threshold value.

13. The method as claimed in claim 1, wherein performing the specific signaling process comprises generating and/or transmitting user information to a user, wherein different user information is generated and/or transmitted to the user at different times based on the parameter which represents the reason for the interruption of the charging process.

14. The method as claimed in claim 4, wherein performing the specific signaling process comprises generating and/or transmitting user information to a user, wherein different user information is generated and/or transmitted to the user at different times based on the parameter which represents the reason for the interruption of the charging process.

15. The method as claimed in claim 5, wherein performing the specific signaling process comprises generating and/or transmitting user information to a user, wherein different user information is generated and/or transmitted to the user at different times based on the parameter which represents the reason for the interruption of the charging process.

16. A charging apparatus configured to charge a traction energy storage device of an at least partially electrically powered vehicle, wherein the charging apparatus comprises:
   a means for detecting an interruption of a charging process;
   a means for determining a reason for the interruption of the charging process according to probability values of a plurality of potential reasons for the interruption; and
   a means for selecting at least one measure from among a set of measures stored in a computer memory, based on the determined reason for the interruption of the charging process, the set of measures including: reinitiating the charging process, initiating a modified charging process, and performing a specific signaling process.

17. The charging apparatus of claim 16, further comprising a transceiver unit, wherein the charging apparatus is configured to exchange data corresponding to the charging process with at least one of a vehicle transceiver unit vehicle and a mobile user apparatus.

18. A system for charging a traction energy storage device of a vehicle which can be operated at least partially electrically, the system comprising:

a charging apparatus having:
  a means for detecting an interruption of a charging process,
  a means for determining a reason for the interruption of the charging process according to probability values of a plurality of potential reasons for the interruption, and
  a means for selecting at least one measure from among a set of measures stored in a computer memory, based on the determined reason for the interruption of the charging process, the set of measures including: reinitiating the charging process, initiating a modified charging process, and performing a specific signaling process;
a vehicle having a traction energy storage device which can be charged by the charging apparatus; and
a mobile user apparatus.

* * * * *